(12) United States Patent
Bouty et al.

(10) Patent No.: US 7,891,195 B2
(45) Date of Patent: Feb. 22, 2011

(54) CENTRAL BODY OF A TURBOJET NOZZLE

(75) Inventors: Eric Jean-Louis Bouty, Moissy Cramayel (FR); Alain Dravet, Les Pennes Mirabeau (FR); Thierry Jacques Albert Le Docte, Gainneville (FR); Georges Jean Xavier Riou, Melun (FR); Thomas Alain Christian Vincent, Gif sur Yvette (FR)

(73) Assignee: SNECMA, Paris (FR)

( * ) Notice: Subject to any disclaimer, the term of this patent is extended or adjusted under 35 U.S.C. 154(b) by 1005 days.

(21) Appl. No.: 11/690,381

(22) Filed: Mar. 23, 2007

(65) Prior Publication Data

US 2007/0220894 A1 Sep. 27, 2007

(30) Foreign Application Priority Data

Mar. 24, 2006 (FR) ................................. 06 02580

(51) Int. Cl.
*F02K 1/00* (2006.01)
(52) U.S. Cl. ........................... 60/770; 181/213
(58) Field of Classification Search ................ 60/770, 60/725; 181/213, 222
See application file for complete search history.

(56) References Cited

U.S. PATENT DOCUMENTS

| 2,988,302 | A | * | 6/1961 | Smith | 244/15 |
|---|---|---|---|---|---|
| 3,542,152 | A | * | 11/1970 | Oxx, Jr et al. | 181/214 |
| 4,064,961 | A | | 12/1977 | Tseo | |
| 4,122,672 | A | * | 10/1978 | Lowrie | 60/226.1 |
| 4,137,992 | A | | 2/1979 | Herman | |
| 4,240,519 | A | | 12/1980 | Wynosky | |
| 4,258,822 | A | | 3/1981 | Streib | |
| 4,947,958 | A | * | 8/1990 | Snyder | 181/296 |
| 5,592,813 | A | * | 1/1997 | Webb | 60/226.2 |
| 5,655,361 | A | * | 8/1997 | Kishi | 60/266 |
| 6,351,947 | B1 | * | 3/2002 | Keller et al. | 60/725 |
| 6,530,221 | B1 | * | 3/2003 | Sattinger et al. | 60/725 |
| 6,584,766 | B1 | * | 7/2003 | Czachor | 60/266 |
| 6,845,607 | B2 | * | 1/2005 | Lair | 60/263 |
| 7,267,297 | B2 | * | 9/2007 | Campbell et al. | 244/1 N |
| 7,413,053 | B2 | * | 8/2008 | Wasif et al. | 181/293 |
| 7,549,506 | B2 | * | 6/2009 | Sattinger | 181/213 |

OTHER PUBLICATIONS

U.S. Appl. No. 11/742,849, filed May 1, 2007, Vincent.

* cited by examiner

*Primary Examiner*—William H Rodríguez
(74) *Attorney, Agent, or Firm*—Oblon, Spivak, McClelland, Maier & Neustadt, L.L.P.

(57) ABSTRACT

A device for attenuating acoustical noise from an exhaust nozzle of a turbojet is disclosed. The turbojet exhaust nozzle includes a central body defining the inner surface of the primary gas flow path. The central body includes an outer wall defining one, and only one, resonator cavity. The single resonator cavity is in fluid communication with the primary gas flow path via orifices through at least one upstream portion of the outer wall. The single resonator cavity and plurality of orifices compose a Helmholtz resonator.

18 Claims, 1 Drawing Sheet

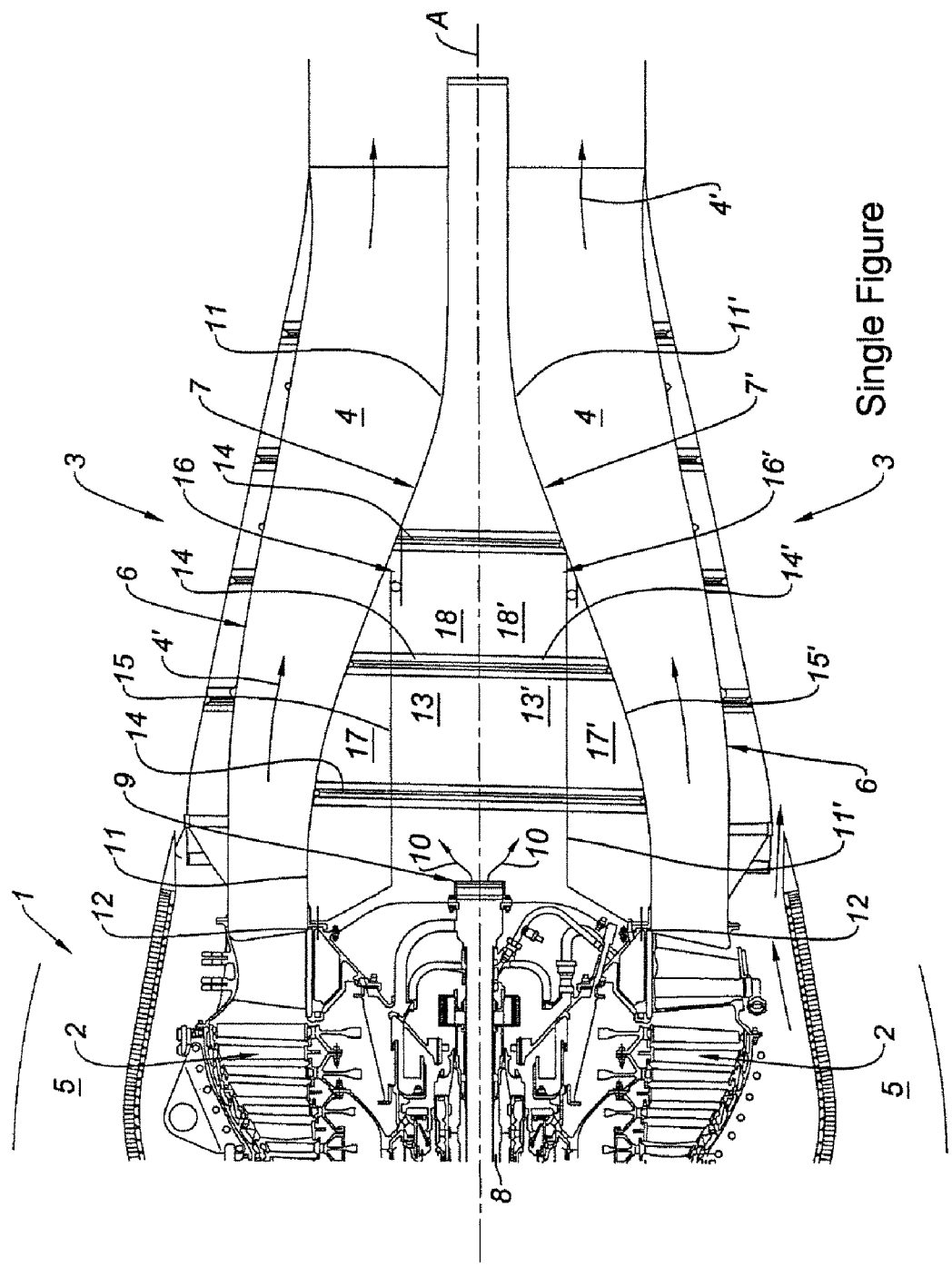
Single Figure

CENTRAL BODY OF A TURBOJET NOZZLE

The invention relates to the field of noise reduction at the outlet of a turbojet.

BACKGROUND OF THE INVENTION

A turbojet comprises, from upstream to downstream in the direction of the gas flow, a fan, one or more compressor stages, a combustion chamber, one or more turbine stages and a gas exhaust nozzle. These are the gases of the primary stream of the turbojet, that is to say the gas stream at the outlet from the turbine stages and originating from the combustion chamber that escape via the gas exhaust nozzle.

The nozzle usually comprises an outer nozzle casing that delimits the outer envelope of the gas jet of the exhaust stream, as well as an inner nozzle casing that delimits the inner envelope of the gas jet of the exhaust stream to help with its flow. The inner nozzle casing forms a central body of the nozzle and has the shape of a wall having a surface of revolution, that may be cylindrical, conical or more usually of an aerodynamic shape adapted to the stream, that is axisymmetric about the axis of the turbojet. Those skilled in the art usually call this central nozzle body the "plug". It will hereafter be called the central nozzle body or central body.

Note that the wall of the central nozzle body may also not be axisymmetric for reasons of reducing the noise of the gas jet or reducing the infrared signature; the central body may, in this case, have a wavy, rectangular or elliptical cross section for example. The present invention applies particularly well to a central body with an axisymmetric wall—as is usually the case in civil applications—but also applies to a central body that is not axisymmetric.

In certain turbojets, the central body fulfills another function that is to guide the turbojet vapor relief stream. Specifically, on certain turbojets, at the downstream end of its central shaft, a vapor relief orifice is provided through which various fluids such as oil vapor, certain cooling gases, etc. escape. This is usually called the deaerator. In this case, either a tube to guide the vapor relief stream extends within the central body to its end, for channeled guidance of the vapor relief stream, or no pipe is provided, the central body providing, via its inner surface, the guidance of the vapor relief stream. Vapor relief is usually carried out by aspiration, the pressure within the pipe or the central body being less than the pressure in the turbojet enclosure.

A constant problem for the manufacturers of engines is noise reduction, particularly for the comfort of the passengers and the inhabitants of the zones overflown by the aircraft. It is therefore advisable to attenuate the noise, particularly the noise in the nozzle, that consists of the noise of the combustion chamber, or combustion noise, that is at low frequencies, and the noise of the high and low pressure turbines, or turbine noise, that is at higher frequencies. With conventional passive acoustic coatings, that is to say devices whose geometry is fixed, the low frequency combustion noise cannot be attenuated with the outer nozzle casing, because the volume at this location is insufficient. It is therefore the higher frequency turbine noise that may be treated on the outer nozzle casing, for example with the aid of a thin layer of a material formed into honeycombs. The problem posed therefore is that of attenuating the low frequency combustion noise.

DESCRIPTION OF THE PRIOR ART

Document U.S. Pat. No. 5,592,813 discloses the use of a central combustion noise attenuation body comprising two concentric surfaces between which honeycombs are made over a considerable thickness. Also, document EP 1,391,597 discloses the use of a central body formed of two cones for noise attenuation, the outer cone being perforated and cavities being made between the two cones under the perforations. These cavities form a sort of large dimension honeycomb, better filtering the low frequency noises. Each assembly of a cavity and a plurality of holes forms a Helmholtz resonator, well known to those skilled in the art. The same applies to the honeycombs, on a smaller scale, but over a great thickness.

The two solutions presented produce good noise attenuation results. They are however very costly, in price and in weight, to install. It is almost impossible—and therefore expensive—to fold metal sheets formed into honeycombs, while installing larger cavities is awkward and of some weight.

SUMMARY OF THE INVENTION

The present invention aims to propose a less costly and lighter device for attenuating the low frequency noises of the engine. Low frequencies typically mean frequencies generally lying between 500 and 1000 Hz.

Accordingly, the invention relates to a central body of a turbojet nozzle comprising a wall forming a cavity, which comprises a plurality of orifices pierced over at least one upstream portion of its wall and a single resonance cavity forming a Helmholtz resonator.

Such a central body makes it possible to attenuate low frequency noises. It forms a Helmholtz resonator with a plurality of orifices and a single cavity common to all the orifices. The invention therefore has consisted in replacing a central body, with a plurality of cavities forming Helmholtz resonators, with a central body with a single cavity, common to a plurality of orifices, forming a single Helmholtz resonator. Although the acoustic performance of such a resonator is worse than that of the devices of the prior art explained hereinabove—it is possible to predict a 30% reduction in attenuation performance—, the cost and weight of such a central body are markedly reduced. The invention therefore resides in a device offering a compromise between the acoustic attenuation performance on the one hand, and the cost and weight of the acoustic attenuation device on the other hand. The longitudinal extent of the upstream portion pierced with orifices is preferably determined by computations, based on a law of static pressure within the cavity, the downstream limit of this portion being fixed according to maximum tolerated aerodynamic losses, by recirculation of the exhaust gas stream in the cavity. Note that, if high losses are tolerated, the upstream wall may mean the whole wall of the central body.

In a particular embodiment, the central body comprises an inner wall, not pierced, inside the wall forming the cavity, delimiting an outer cavity, forming said single resonance cavity, and an inner cavity.

Such a wall makes it possible to regulate the volume of the resonator and hence to adapt it to the frequencies that it is desired to attenuate. Furthermore, this wall may, where necessary, in the case of a turbojet comprising a deaerator, make it possible to separate the cavity of the central body into two cavities: a resonance cavity and a cavity for guidance of the vapor relief stream.

If an inner wall is provided, the resonant cavity comprises an outer wall, in which the orifices are pierced, and an inner wall, and it is either one of these outer and inner cavities that may be fitted to the central body.

Preferably in this case, a seal is provided between the outer and inner walls to take up the expansion differentials.

Advantageously, the wall forming the cavity is a wall of revolution. It is usually the case of the central bodies of turbojets for civil applications, for which the invention is particularly intended since the problems of cost and weight are especially noticeable therein. The structure of the central body is thereby simplified accordingly.

Advantageously again, the central body comprises at least one stiffener means making it possible to improve its mechanical strength.

Still advantageously, the wall forming the central body is a metal wall, preferably of constant thickness.

The invention also relates to a turbojet comprising a nozzle with the central body described hereinabove.

BRIEF DESCRIPTION OF THE DRAWINGS

The invention will be better understood with the aid of the following description of two preferred embodiments of the invention, with reference to the single appended FIGURE which represents a schematic view in section of a turbojet with the central body of the invention divided into two parts along a plane of symmetry, perpendicular to the sectional plane and passing through the axis of the turbojet, the top portion representing a first embodiment of the central body of the invention and the bottom portion a second embodiment of the central body of the invention.

In its top portion, the FIGURE shows a first embodiment, in its bottom portion, a second embodiment, in a symmetrical manner relative to a plane perpendicular to the sectional plane and passing through the axis A of the turbojet. The elements common to the two embodiments will be indicated by identical reference numbers.

DESCRIPTION OF THE PREFERRED EMBODIMENTS

The turbojet 1 shown is a twin-spool turbofan turbojet. It comprises, from upstream to downstream in the direction of flow of the gases, a fan, a low pressure compressor, a high pressure compressor, a combustion chamber, a high pressure turbine, a low pressure turbine 2 and a gas exhaust nozzle 3. The gas enters the turbojet via the fan and is divided, downstream of the fan and then along the whole turbojet, into a primary gas stream 4 and a secondary gas stream. The primary gas stream 4 passes into the compressors, the combustion chamber and the turbines to escape via the nozzle 3. The secondary gas stream 5, originating directly from the fan and also collecting a little gas tapped from the turbojet enclosure, escapes at the periphery of the nozzle, upstream of the latter, guided from the fan by the turbojet nacelle. In this type of engine, it is the secondary gas stream 5 that mainly provides the engine thrust.

The nozzle 3 comprises an outer nozzle casing 6 whose inner surface delimits the outer envelope of the jet of the primary stream in the nozzle 3, and an inner nozzle casing 7, or central body 7, whose outer surface delimits the inner envelope of the jet of the primary stream in the nozzle 3, in a manner known to those skilled in the art. The primary air stream 4 is therefore guided between the inner casing 7 and outer casing 6 of the nozzle 3, as is shown schematically by the arrows 4'.

The low pressure rotor, comprising in particular the low pressure compressor and turbine, comprises a shaft 8. In the turbojet described here, a deaerator 9 is provided at the downstream end of the shaft 8 of the low pressure rotor. As schematized by the arrows 10, oil vapor, various cooling gases etc., escape via the deaerator, by a suction phenomenon, as will be seen below; this is the vapor relief stream 10.

With reference to the top portion of the FIGURE, the central body 7 comprises an outer wall 11 that is a metal wall here, preferably of constant thickness. This outer wall 11 is a wall of revolution here, that is to say that it is axisymmetric about the axis A of the turbojet. Here it has a shape similar to that of the central bodies of the prior art, namely an aerodynamic shape arranged to guide the primary gas stream 4. In this instance, from upstream to downstream, the outer wall 11 is successively of cylindrical shape, truncated cone shape with a diameter reducing in the downstream direction, then cylindrical again, of lesser diameter than the upstream portion. These shapes follow on in a continuous and curvilinear manner. The outer wall 11 is attached, on the upstream side, to the fixed structure 12 of the turbojet 1, in the extension of a wall delimiting the inner envelope of the jet of the primary gas stream 4 emerging from the low pressure turbine 2.

The wall 11 defines a cavity 13 that will be called the global cavity 13 because it corresponds to the global volume delimited by the outer wall 11 of the central body 7. This cavity 13 is hollow, that is to say that it is not provided with honeycomb layers or other plurality of resonance cavities as in the prior art, for noise attenuation.

Preferably, stiffener means 14 are provided that participate in the mechanical strength of the central body 7. These stiffener means 14 here have the shape of circumferential ribs made on the inner surface of the outer wall 11 of the central body 7. Here they are three in number.

The outer wall 11 of the central body 7 is pierced with a plurality of orifices over an upstream portion of its surface, in a manner that cannot be seen in the FIGURE due to their smallness. These orifices therefore open, on the one hand, into the primary gas stream of the turbojet 1, on the other hand, into the cavity 13 of the central body 7. In this instance, orifices are pierced regularly over an upstream portion of the wall 11, that extends up to the second stiffener means 14. These orifices here all have an identical diameter and are distributed uniformly. Typically, for a central body 7 of which the diameter of the cylindrical upstream portion is of the order of 60 to 70 cm, the orifices have a diameter of 0.5 to 1.5 mm.

The central body 7 furthermore comprises an inner wall 15 that extends inside the outer wall of revolution 11 delimiting the global cavity 13. This inner wall 15 is solid, that is to say that it is not pierced with orifices. Here it is metallic, preferably of constant thickness. The inner wall 15 is attached upstream to the fixed structure 12 of the turbojet 1, in this instance in the same location and where necessary by the same fastening means as the outer wall 11. From this attachment zone, the inner wall 15 comprises a truncated cone portion whose diameter diminishes very rapidly and in the downstream direction, then a cylindrical portion. The downstream end of this cylindrical portion is attached to the inner surface of the outer wall 11 of the central body 7, in this instance to a flange protruding from this surface. Preferably it is attached via a seal 16, shaped in an appropriate manner so as to compensate for the expansion differential existing between the outer wall 11 and the inner wall 15, because the outer wall 11 is directly subjected to the primary gas stream and therefore heats up very quickly, the inner wall 15 being less exposed and heating up less quickly. Any type of appropriate seal may be envisaged that provides a freedom of movement to the elements that it attaches. The inner wall 15 is connected to the outer wall 11 at a zone situated downstream of the downstream limit of the upstream portion of the outer wall 11 in which the orifices are pierced.

The inner wall 15 therefore delimits an outer cavity 17, that extends between the outer wall 11 and the inner wall 15, and an inner cavity 18, corresponding to the rest of the global cavity 13 delimited by the outer wall 11 of the central body 7.

The outer cavity 17 forms a resonance cavity 17 whose function is to attenuate the low frequency noises in the nozzle, particularly the combustion noise, in cooperation with the orifices pierced in the outer wall 11 of the central body 7, orifices that open, on the one hand, into this resonance cavity 17, on the other hand, into the primary gas stream. With the resonance cavity 17, the orifices form a Helmholtz resonator, with a single resonance cavity 17, common to all the orifices.

The effectiveness of such a Helmholtz resonator, with a single resonance cavity 17 for a plurality of orifices, is less than that of a plurality of Helmholtz resonators, comprising a separate cavity for each orifice. The loss in attenuation effectiveness between these two types of resonators can be estimated at 30%. However, the central body 7 of the invention is simple to install, therefore of low cost, and has low weight. It is therefore a compromise between, on the one hand, an effectiveness that is acceptable for noise attenuation, on the other hand, reasonable cost and weight.

The presence of the inner wall 15, forming the inner wall of the resonance cavity 17, makes it possible to adjust the volume of the resonance cavity 17 according to the frequencies that it is desired to attenuate.

Furthermore, this inner wall 15 provides, via its inner surface, a guidance function for the vapor relief stream emerging from the deaerator 9. As it is not pierced with orifices, it makes it possible to maintain, in the inner cavity 18 for guidance of the vapor relief stream, a pressure that is lower than the pressure in the enclosure of the turbojet 1, which allows the vapor relief stream to be aspirated into the inner cavity 18. Specifically, the pressure in the resonance cavity 17 is greater than the pressure in the inner cavity 18 because a little gas of the primary stream penetrates through the orifices.

The longitudinal extent of the upstream portion of the outer wall 11 that is pierced with orifices is determined by computations, based on a law of static pressure within the resonance cavity 17. Specifically, the primary gas stream tends to recirculate in the resonance cavity 17, that is to say enters via an upstream orifice and exits via a downstream orifice. The less the portion of wall pierced with orifices is extended longitudinally, the less significant this phenomenon. The longitudinal abscissa, on the wall 11 of the central body 7, from which there are no more orifices, is determined according to the tolerance threshold, that those skilled in the art set, for this gas recirculation. Incidentally, if this tolerance threshold is not too demanding, this upstream portion could be taken to be the whole portion of the outer wall 11 that is in line with the inner wall 15, that is to say that forms the inner wall of the resonance cavity 17. In the instance shown, the limit has been set approximately at the second rib forming the stiffener means 14. The computations may be made in two or three dimensions, according to the required degree of precision; they make it possible to compute the distribution (law) of static pressure in a wall according to the change in the cross section and the Mach number in the primary gas stream 4.

With reference to the bottom portion of the FIGURE, in the second embodiment presented here, the central body 7' has, as previously, a wall 11'. The difference is that this wall 11' corresponds, in its downstream portion, to the outer wall 11 previously described, in its upstream portion delimiting the resonance cavity, to the inner wall 15 of the central body of the first embodiment. The central body 7' also comprises an outer wall 15', that is to say that forms the outer wall of the resonance cavity that has the shape of the upstream portion of the outer wall 11 of the first embodiment, that is in line with the inner wall 15, that is to say that forms the outer wall of the resonance cavity 17.

In other words, the central body 7' of the second embodiment defines, as previously, a global cavity 13', divided into a resonance cavity 17' and an inner cavity 18' that have the same shapes and volumes as in the first embodiment. The difference is that, in the first embodiment, the outer wall 11 is in a single piece and defines all the outer walls of the central body 7, corresponding to a central body of the prior art, with the orifices in addition, while the inner wall 15 is fitted to form the resonance cavity 17, while in the second embodiment, it is the outer wall 15' of the resonance cavity 17' that is fitted to a wall 11' of the central body that defines in this way, in its upstream portion, the inner wall of the resonance cavity 17', in its downstream portion, the shape of the corresponding downstream portion of the central body 7'. Therefore, it is just a question of knowing which portion is in a single piece up to the downstream end of the central body 7, 7'.

In this second embodiment, the wall of revolution defining the global cavity 13' of the central body therefore consists of the outer wall 15' and a downstream portion of the single-piece wall 11', the upstream portion of which defines the inner wall of the resonance cavity 17'. There is however again a global cavity 13' of the central body 7', a single resonance cavity 17', in communication with the orifices opening into the primary gas stream, and an inner cavity for the guidance of the vapor relief stream originating from the deaerator 9, not communicating with the resonance cavity 17'.

As above, the walls 11', 15' forming the resonance cavity 17' are connected by a seal 16', in order to take up the expansion differentials, and stiffener means 14', in the form of ribs, are provided for the mechanical strength of the central body 7'. It is the fitted outer wall 15' that comprises the orifices, opening into the primary gas stream and communicating with the resonance cavity 17' to form a Helmholtz resonator with a single resonance cavity 17', common to the orifices. The various comments made for the first embodiment apply mutatis mutandis.

It goes without saying that the structure and the arrangement of the various embodiments may be modified by those skilled in the art.

In particular, in the absence of a deaerator 9, those skilled in the art may decide not to provide an inner wall 15 within the global cavity 13 of the central body 7. In this case, it is the whole of the cavity 13 formed by the wall of revolution 11 that forms a resonance cavity 13, into which the orifices open, also opening into the primary gas stream. If the gas recirculation tolerance threshold is not too demanding, it is therefore the whole wall of the central body 7 that could be pierced with orifices.

Furthermore, and even in the absence of a deaerator 9, those skilled in the art may provide an inner wall 15, or outer wall 15', forming a resonance cavity 17, 17' of smaller volume than the global cavity 13, 13' for the purpose of dimensioning the volume of this resonance cavity 17 according to the frequencies of the noise that is to be attenuated.

In addition, various shapes and volumes are possible for the cavities. The inner wall 15 could be of curvilinear shape, or else consist of a rectilinear pipe of small diameter serving only as a means of guidance for the vapor relief stream.

The invention claimed is:

1. A central body disposed within an outer casing of a turbojet gas exhaust nozzle, defining a primary gas stream flow path therebetween, comprising:
   a first wall forming a first cavity, the first wall disposed between the first cavity and the primary gas stream flow path, and the first wall and the first cavity disposed downstream of a final turbine stage; and a plurality of orifices through at least one upstream portion of the first wall, wherein the plurality of orifices are in fluid communication with the first cavity and the primary gas stream flow path, wherein the first cavity and the plurality of orifices compose a Helmholtz resonator with a single resonance cavity, wherein the single resonance cavity is the only resonance cavity in the central body in fluid communication with the primary gas stream flow path, and wherein the plurality of orifices are configured to attenuate noise by passing acoustic waves while limiting a convective flow through the plurality of orifices and the first cavity.

2. The central body as claimed in claim 1, further comprising:

a second wall disposed within the first wall, wherein the second wall forms a boundary of the first cavity, and the second wall defines a second cavity, and wherein the first cavity is not in fluid communication with the second cavity.

3. The central body as claimed in claim 2, wherein the second cavity is in fluid communication with a vapor relief stream, for a turbojet comprising a deaerator.

4. The central body as claimed in claim 2, further comprising:

a seal disposed between the second wall and the first wall.

5. The central body as claimed in claim 1, wherein the first wall is a wall of revolution.

6. The central body as claimed in claim 1, further comprising:

at least one mechanical stiffener disposed on an inner surface of the first wall.

7. The central body as claimed in claim 1, wherein the first wall is a metal wall.

8. The central body of a turbojet gas exhaust nozzle as claimed in claim 7, wherein the metal wall is of approximately uniform thickness.

9. A turbojet comprising:

a gas exhaust nozzle outer casing; and a gas exhaust nozzle inner casing spaced apart from the gas exhaust nozzle outer casing, defining a primary gas stream flow path therebetween, the gas exhaust nozzle inner casing defines a central body comprising:

a first wall forming a first cavity, the first wall disposed between the first cavity and the primary gas stream flow path, and the first wall and the first cavity disposed downstream of a final turbine stage; and a plurality of orifices through at least one upstream portion of the first wall, wherein the plurality of orifices are in fluid communication with the first cavity and the primary gas stream flow path, wherein the first cavity and the plurality of orifices compose a Helmholtz resonator with a single resonance cavity, wherein the single resonance cavity is the only resonance cavity in the central body in fluid communication with the primary gas stream flow path, and wherein the plurality of orifices are configured to attenuate noise by passing acoustic waves while restricting a gas flow from entering an upstream orifice of the plurality of orifices and exiting a downstream orifice of the plurality of orifices.

10. A central body disposed within an outer casing of a turbojet gas exhaust nozzle, defining a primary gas stream flow path therebetween, comprising:

a first wall forming a first cavity, the first wall disposed between the first cavity and the primary gas stream flow path, and the first wall and the first cavity disposed downstream of a final turbine stage;

a plurality of orifices through at least one upstream portion of the first wall; and at least one mechanical stiffener disposed on an inner surface of the first wall, wherein the plurality of orifices are in fluid communication with the first cavity and the primary gas stream flow path, wherein the first cavity and the plurality of orifices compose a Helmholtz resonator with a single resonance cavity, and wherein the single resonance cavity is the only resonance cavity in the central body in fluid communication with the primary gas stream flow path.

11. The central body as claimed in claim 10, further comprising:

a second wall disposed within the first wall, wherein the second wall forms a boundary of the first cavity, and the second wall defines a second cavity, and wherein the first cavity is not in fluid communication with the second cavity.

12. The central body as claimed in claim 10, wherein the at least one mechanical stiffener is a circumferential rib.

13. The central body as claimed in claim 12, wherein the at least one mechanical stiffener consists of three mechanical stiffeners.

14. The central body as claimed in claim 11, wherein the plurality of orifices are distributed over a plurality of longitudinal locations between an upstream end of the first wall and an intersection of the first wall and the second wall.

15. The central body as claimed in claim 12, wherein the plurality of orifices are distributed over a plurality of longitudinal locations between an upstream end of the first wall and the at least one mechanical stiffener.

16. The central body as claimed in claim 12, wherein the at least one mechanical stiffener comprises:

a first mechanical stiffener; and a second mechanical stiffener located sequentially downstream of the first mechanical stiffener, wherein the plurality of orifices are distributed over a plurality of longitudinal locations between an upstream end of the first wall and the second mechanical stiffener.

17. The central body as claimed in claim 12, wherein the at least one mechanical stiffener comprises:

a first mechanical stiffener;

a second mechanical stiffener located sequentially downstream of the first mechanical stiffener; and a third mechanical stiffener located sequentially downstream of the second mechanical stiffener, wherein the plurality of orifices are distributed over a plurality of longitudinal locations between an upstream end of the first wall and the third mechanical stiffener.

18. The central body as claimed in claim 10, wherein the plurality of orifices have diameters ranging from about 0.02 inches (0.5 mm) to about 0.06 inches (1.5 mm).

* * * * *